United States Patent
Lykke et al.

(10) Patent No.: US 12,426,604 B2
(45) Date of Patent: Sep. 30, 2025

(54) METHOD AND SYSTEM FOR PRE-STUNNING AND/OR STUNNING ANIMALS

(71) Applicant: MAREL MEAT A/S, Roskilde (DK)

(72) Inventors: Leif Lykke, Holbæk (DK); Steen Hegnsgaard Weihe, Holbæk (DK)

(73) Assignee: MAREL MEAT A/S, Roskilde (DK)

(*) Notice: Subject to any disclaimer, the term of this patent is extended or adjusted under 35 U.S.C. 154(b) by 102 days.

(21) Appl. No.: 17/760,417

(22) PCT Filed: Feb. 17, 2021

(86) PCT No.: PCT/EP2021/053806
§ 371 (c)(1),
(2) Date: Aug. 9, 2022

(87) PCT Pub. No.: WO2021/165279
PCT Pub. Date: Aug. 26, 2021

(65) Prior Publication Data
US 2023/0076339 A1    Mar. 9, 2023

(30) Foreign Application Priority Data
Feb. 19, 2020    (EP) .................................. 20158117

(51) Int. Cl.
*A22B 3/00*    (2006.01)

(52) U.S. Cl.
CPC .................................. *A22B 3/005* (2013.01)

(58) Field of Classification Search
CPC ....... A22B 3/005; A61M 16/10; A61M 16/12; A61M 2021/0016
(Continued)

(56) References Cited

U.S. PATENT DOCUMENTS 4,107,818 A * 8/1978 Scott .................. A61M 16/104
  606/1
5,112,270 A * 5/1992 Howard .................. A22B 3/02
  452/62
(Continued)

FOREIGN PATENT DOCUMENTS

| CN | 1291093 A | 4/2001 |
| CN | 104623084 A | 5/2015 |

(Continued)

OTHER PUBLICATIONS

H. Barthelemy et al., "The Pig Appeasing Pheromone: How Chemical Communication Improve the Welfare of Pigs," Research Institute in Semiochemistry and Applied Ethology (IRSEA), Le Chêne, France, at least as early as Jun. 30, 2013.
(Continued)

*Primary Examiner* — David J Parsley
(74) *Attorney, Agent, or Firm* — Workman Nydegger (57) ABSTRACT

A method is provided for reducing animal reactions when exposed to a pre- stunning relaxation gas and/or stunning gas during a pre-stunning and/or stunning process. The method includes exposing at least one animal to a pre-stunning relaxation gas and/or stunning gas for an exposure period and exposing at least one animal to at least one smell additive at least during a part of the exposure period, particularly during an initial part. Exposing the at least one animal to the at least one smell additive includes dispensing the at least one smell additive via a dispensing device. The smell additive is selected from the group of: one or more pheromones, chemical analogs of pheromones, natural fruity smells, and chemical analogs of natural fruity smells.

15 Claims, 1 Drawing Sheet

(58) Field of Classification Search
USPC ........................................ 452/66; 128/203.12
See application file for complete search history.

(56) References Cited

U.S. PATENT DOCUMENTS

| | | | |
|---|---|---|---|
| 5,643,072 A * | 7/1997 | Lankhaar | A22C 21/0015 452/66 |
| 6,077,867 A | 6/2000 | Pageat | |
| 6,174,228 B1 * | 1/2001 | Grimsland | A22B 3/00 452/66 |
| 6,384,252 B1 | 5/2002 | Pageat | |
| 7,448,943 B1 * | 11/2008 | Woodford | A22B 3/086 452/66 |
| 10,757,948 B2 | 9/2020 | Larsen et al. | |
| 2016/0279373 A1 * | 9/2016 | Miller | A61M 16/01 |
| 2018/0132495 A1 | 5/2018 | Larsen et al. | |
| 2020/0164096 A1 * | 5/2020 | Wang | A61L 9/044 |

FOREIGN PATENT DOCUMENTS

| | | |
|---|---|---|
| CN | 204377776 U | 6/2015 |
| CN | 107960058 A | 4/2018 |
| DE | 19801713 A1 | 7/1999 |
| EP | 0948963 A1 | 10/1999 |
| EP | 1047415 B1 | 12/2004 |
| EP | 1495678 A1 | 1/2005 |
| FR | 2914864 A1 | 10/2008 |
| JP | S5081878 A | 7/1975 |
| JP | 2005143389 A | 6/2005 |
| JP | 2018082892 A | 5/2018 |
| WO | 201897098 A1 | 5/2018 |
| WO | WO 94/15469 * | 7/2021 |

OTHER PUBLICATIONS

Krebs, Nadège, "Odors and Pheromones: Influences of Olfaction on Behavior, Physiology, and Performance to Reduce Stress in Pigs," Dissertation in Animal Science, Texas Tech University, Dec. 1, 2007, pp. 1-183.
Krebs, N. et al., "Effects of Exposing Pigs to Moving and Odors in a Simulated Slaughter Chute," Applied Animal Behavior Science, Jan. 31, 2009, vol. 116, No. 2-4, pp. 179-195.
Marino et al., "Thinking Pigs: A Comparative Review of Cognition, Emotion, and Personality in Sus domesticus," International Journal of Comparative Psychology, 28 (1), May 13, 2015, retrieved from https://escholarship.org/uc/item/8sx4s79c.
McGlone, J.J., "Olfactory Signals that Modulate Pig Aggressive and Submissive Behavior," Social Stress in Domestic Animals, At least as early as Dec. 31, 1990, pp. 86-109, Published in Dordrecht, the Netherlands, Kluwer Academic Publishers.
Extended European Search Report in corresponding EP application No. 20158117.0, Jul. 10, 2020.
International Search Report in corresponding PCT application No. PCT/EP2021/053806, May 11, 2021.
Chinese Search Report from corresponding Chinese Patent Application No. 202180013437.7, Nov. 2, 2022.
Chinese Office Action from corresponding Chinese Patent Application No. 202180013437.7, Nov. 10, 2022.
Japanese Office Action from Corresponding Japanese Patent Application No. JP2022-547872, Oct. 22, 2024.

* cited by examiner

METHOD AND SYSTEM FOR PRE-STUNNING AND/OR STUNNING ANIMALS

The present invention relates to a method for reducing the animal reaction to stunning gas in a pre-stunning and/or stunning process. Especially the method is for use at abattoirs during pre-stunning and/or stunning of domestic animals.

BACKGROUND

Awareness of animal well-being is today highly respected e.g. in abattoirs. The purpose of stunning animals is to deprive the animals of pain perception, such as prior to killing. The stunning procedure should ensure that no animals regain consciousness before, during or after the killing process and each animal must remain unconscious and insensitive until it is killed.

When stunning animals by gas, there is a progressive loss of consciousness and anesthesia. The process may be described as a succession of stages, starting from an analgesia stage, followed by an excitation stage, an anesthesia stage and finally collapse.

A frequently used stunning method for stunning pigs involves exposure to $CO_2$. For pigs stunned with $CO_2$ the following can be observed: During the analgesia stage, the pigs are still standing upright; during the excitation stage, pigs are lying down; during the anesthesia stage, pigs still have a corneal reflex, though it disappears in the deep anesthesia. In the collapse stage, the pigs have no reflexes at all.

During the above stages of stunning, the animal is typically brought through the following physical processes: Conscious movement, dizzy/uncertain movements, loses balance and lies down, excitation (unconscious), regular respiration depressed and lost (thoracic), cilia reflex (lash reflex) is lost, cornea reflex is lost, superficial gasping respiration (diaphragm) and death.

In prior art systems and methods of stunning animals such as pigs at abattoirs prior to killing, severe reactions can be observed for many animals during the first part of a stunning process. Such reactions may occur when the pigs are initially exposed to e.g. $CO_2$ and into excitation and stressed behavior.

Despite previous efforts there is still a need to further reduce the stress level of animals such as pigs associated with the stunning process. In particular, it is desirable to further improve animal well-being in connection with the stunning procedure. Moreover, the animal reactions may result in bruises and reduce meat quality. On this background and even though the observed reactions during the initial phases of the stunning process only last for a short period of time, it is desirable to reduce these reactions to the extent possible.

SUMMARY

In general, at least some embodiments of the method and system disclosed herein seek to mitigate, alleviate or eliminate one or more of the above-mentioned disadvantages and/or other disadvantages of the prior art.

According to one aspect, disclosed herein are embodiments of a method of reducing animal reactions when exposed to a pre-stunning relaxation gas and/or stunning gas during a pre-stunning and/or stunning process, the method comprising:

exposing at least one animal to a pre-stunning relaxation gas and/or stunning gas for an exposure period;

exposing the at least one animal to at least one smell additive at least during a part of said exposure period, in particular during an initial part of said exposure period.

Embodiments of the method described herein reduce or even prevent severe reactions that one may otherwise observe during the initial phases of the stunning process of animals such as pigs. The animal reactions when exposed to the pre-stunning relaxation gas and/or stunning gas in the presence of a smell additive indicate a very low level or even no excitation, thereby increasing animal well-being and reducing the risk of downgraded meat quality. The presence of the smell additive thus masks the pre-stunning relaxation gas and/or stunning gas in the sense that the presence of the smell additive has been found to considerably reduce the excitation-causing perception of the presence of the pre-stunning relaxation gas and/or stunning gas by the animal.

The present disclosure relates to different aspects including the method described above and, in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, embodiments of a system for pre-stunning and/or stunning animals comprise:
an enclosure configured for enclosing at least one animal to be pre-stunned and/or stunned,
means for providing a pre-stunning relaxation gas and/or stunning gas inside the enclosure, and
means for supplying the enclosure with at least one smell additive.

DETAILED DESCRIPTION

At least some embodiments of the method disclosed herein reduce animal reactions during a stunning process by means of stunning gas. In particular, the stunning process may be performed at an abattoir.

The inventors have realized that animal reactions during the stunning process may considerably be reduced when the animals are exposed to a smell additive at least during a part of the exposure to the stunning gas, in particular during an initial part of the exposure to the stunning gas. During the stunning process the at least one animal is exposed to a stunning gas for a stunning exposure period. The at least one animal is exposed to at least one smell additive at least during a part of said stunning exposure period, in particular an initial part of said stunning exposure period.

It is believed that the presence of a smell-additive masks the perception of the exposure to the stunning gas. The inventors have found a considerable decrease in animal reactions to stunning gas when the animals are exposed to a smell additive in addition to an exposure to the stunning gas.

The inventors have observed that severe reactions, let alone panic or aversive reactions, can be avoided when administering a smell additive in addition to a stunning gas.

In some embodiments, a pre-stunning process precedes the stunning process. In a pre-stunning process, the at least one animal to be stunned is exposed to a pre-stunning relaxation gas, in particular to a pre-stunning relaxation gas mixture. The exposure to the pre-stunning relaxation gas may last for a pre-stunning relaxation exposure period. The inventors have realized that animal reactions during the pre-stunning process and/or during the subsequent stunning process may be reduced when the animals are exposed to a smell additive at least during a part of the exposure to the pre-stunning relaxation gas, in particular during an initial part of the exposure to the pre-stunning relaxation gas. During the pre-stunning process, the at least one animal is exposed to a pre-stunning relaxation gas for a pre-stunning relaxation exposure period, and the at least one animal is exposed to at least one smell additive at least during a part of said pre-stunning relaxation exposure period, in particular an initial part of said pre-stunning relaxation exposure period.

In some embodiments the at least one animal to be stunned may be exposed to the smell additive at least during part of the exposure to the pre-stunning relaxation gas and at least during part of the exposure to the stunning gas. In particular, exposure of the at least one animal to the smell additive may be initiated before or during exposure of said at least one animal to the pre-stunning relaxation gas and continued or repeated during subsequent exposure of said at least one animal to the stunning gas. The smell additive used during pre-stunning may be the same smell additive or a different smell additive as used during the subsequent stunning process.

Alternatively, the at least one animal to be stunned may be exposed to the smell additive either only during at least part of the exposure to the pre-stunning relaxation gas or only during at least part of the exposure to the stunning gas.

The at least one animal may be a domestic animal. The at least one animal may be an animal to be slaughtered. The at least one animal may be an animal selected from the group consisting of pigs, cattle, lambs, goats, poultry.

In particular, some embodiments of the method disclosed herein are particularly useful when stunning animals, such as pigs, that exhibit a relatively high degree of awareness and/or sensitivity to their environment, in particular to changes of their environment. When using $CO_2$ as a stunning gas for stunning pigs, negative reactions may be observed when the $CO_2$ concentration is from 10-20% $CO_2$ or higher. When exposed to such $CO_2$ concentrations, pigs have been observed to move backwards or recoil. Exposure to $CO_2$, in particular to high $CO_2$ concentrations that are typically used during stunning, may lead to more stressed pigs and to visually strong excitation, in particular unconscious movements. Strong excitation can also lead to downgraded meat quality in form of small bruises especially in the ham. Even gasses having no smell, e.g. argon, cause a reaction when pigs are exposed to such a 'smell free' gas. Also, during later phases of the stunning process, pigs can get more excited and this may lead to a stronger excitation (unconscious) movement and result in meat quality downgrading in form of small bruises. There may be a delay, e.g. a delay of about 20-30 s, between the exposure to $CO_2$ and the start of the excitation during which a strong reaction to the gas can be seen.

Throughout the present document, unless explicitly stated otherwise, percentages of gas concentrations are to be understood as volume %.

The at least one animal may be a single animal or a plurality of animals, in particular animals of the same type, such as the same species. Accordingly, embodiments of the method disclosed herein may be used to stun multiple animals concurrently. Each animal of the plurality of animals may be selected from the group consisting of pigs, cattle, lambs, goats, poultry. The plurality of animals may comprise at least two animals, such as 3 animals, e.g. 4 animals, such as 7 or 8 animals, e.g. 15 animals. For relatively large animals, such as cattle, it may be typical to stun a single animal at a time.

Exposing the at least one animal to the stunning gas may include exposing the animal to a stunning gas mixture. The stunning gas mixture may include one or more stunning gases, such as $CO_2$ and one or more other gases.

Preferably, the stunning gas mixture comprises a major amount of a stunning gas having anesthetic effect. In addition to the stunning gas, the stunning gas mixture may include one or more gases normally present in atmospheric air, such as nitrogen, argon, oxygen and combinations thereof. The stunning gas mixture may further include small amounts of other gases, e.g. gases normally present in atmospheric air in small amounts.

The stunning gas may be, or at least include $CO_2$. In particular, the stunning gas mixture may include $CO_2$ at a concentration of at least 30%, such as at least 40%, such as at least 50%, such as at least 70%, such as at least 80%. It will be appreciated that the concentration of $CO_2$ may depend on the type of animal to be stunned. The balance may be other gases normally present in atmospheric air. The balance may include a major amount of a physiologically inert gas such as nitrogen or argon. The balance may include a minor amount of oxygen and/or other gases normally present in small amounts in atmospheric air. The other gases may have a relative concentration, relative to each other, corresponding to or different from their relative concentrations in atmospheric air.

Other examples of stunning gasses include nitrogen and argon or mixtures thereof, or mixtures of nitrogen and/or argon with $CO_2$. In some embodiments, exposure of the at least one animal to the stunning gas comprises exposure to a physiological effective concentration of the stunning gas, in particular a concentration having anesthetic effect.

In some embodiments, during the stunning process, the concentration of the stunning gas is increased from a starting level to a maximum level. In particular, the increase may occur during an initial phase of the stunning process. In some embodiments, the increase occurs over a relatively short period of time, such as over less than 60 s, such as less than 30 s, such as less than 15 s. The starting level may correspond to a normal concentration of the stunning gas in atmospheric air. For example, when $CO_2$ is used as stunning gas, the starting level may be below 10% such as below 5% such as below 1%. The maximum level may be above 50%, such as above 60%, such as above 70%, such as above 80%.

The increase may be obtained by feeding stunning gas into a stunning enclosure such as a stunning chamber, while the at least one animal is positioned inside the stunning enclosure. For example, during stunning, the at least one animal may be positioned in an enclosure where $CO_2$ of a concentration of at least 90% such as at least 95%, such as about 99% is fed into the enclosure until the $CO_2$ concentration in the enclosure reaches a concentration of above 70%, preferably above 80%. Alternatively or additionally, the increase in concentration of the stunning gas to which the at least one animal is exposed may be obtained by moving the animal from an area of low stunning gas concentration into a stunning enclosure, such as a stunning chamber, having a high stunning gas concentration, e.g. an enclosure having been pre-filled with the stunning gas.

The smell additive may be a component with no pharmacological effect. In particular, the smell additive may be a component that has no anesthetic and/or analgesic effect. The smell additive is thus provided in addition to the components of the stunning gas that have a pharmacological effect, in particular in addition to the components of the stunning gas that have an anesthetic and/or analgesic effect. The smell additive may be selected to have an aroma masking or concealing perception of the stunning gas, such as masking an aroma or other sensation invoked by the stunning gas. Accordingly, the smell additive causes the animals to better accept the presence of the stunning gas. In particular, at least in some embodiments, the smell additive is a component whose only effect on the animals is that of masking the aroma or otherwise concealing perception of the presence of the stunning gas. For example, $CO_2$ may be perceived as having a pungent aroma and the smell additive, while not having any pharmacological effect on its own, masks the aroma of the $CO_2$ and provides an improved acceptance of the presence of high concentrations of $CO_2$ by the animals.

The smell additive may be a liquid, a paste, a gas or a solid, such as a liquid, paste or solid including one or more volatile compounds that are perceptible by the one or more animal, in particular volatile aroma compounds. The smell additive may include one or more odorants perceptible by the olfactory system of the at least one animal. Generally, the smell additive may be chosen such that the smell, when perceived by the olfactory system of the at least one animal, is pleasing for the animal or has an otherwise calming effect. It will be appreciated that the choice of smell additive may depend on the animal species to be stunned.

The smell additive may include one or more pheromones or one or more chemical analogs of pheromones. For example, when stunning pigs, examples of pheromones for use as smell additive include the 'Maternal appeasing pheromone' or the 'Pig appeasing pheromone' (PAP), or a synthetic analog thereof, e.g. as described in H. Barthélémy et al.: "The Pig Appeasing Pheromone: How chemical communication improve the welfare of pigs", Research Institute in Semiochemistry and Applied Ethology (IRSEA), Le Chêne, Quartier Salignan 84400 APT-FRANCE or in U.S. Pat. No. 6,077,867.

Alternatively or additionally, the smell additive may include one or more odorants causing an odor or aroma perceived as a pleasant smell by the at least one animal, such as a fruity smell, in particular a sweet fruity smell, preferably a smell of natural fruits. In particular, smell additives having a fruit smell, in particular a sweet fruity smell, such as the smell of apples, in particular sweet apples, or a smell of mango, peach or similar fruits have been found to reduce strong reaction of pigs during stunning.

In some embodiments, the smell additive includes one or more plant extracts, such as a juice or other liquid plant extract, e.g. a fruit juice, in particular a concentrated fruit juice, or other type of fruit extract. Preferably, the plant extract such as fruit extract includes one or more volatile aroma compounds perceivable as the smell of said plant or fruit, preferably the natural smell of said plant or fruit.

Natural plant extracts, in particular natural fruit extracts, such as juices, are commercially available and can easily be manufactured using conventional processes known as such, e.g. including pressing and/or fermentation and/or another suitable process. Accordingly, smell-additives based on natural plant extracts are inexpensive. Moreover, they are uncomplicated in handling and non-toxic.

In some embodiments, the smell additive includes one or more chemical analogues of the volatile aroma compounds perceivable as the smell of a plant or fruit, and or other suitable synthetic odorants.

In some embodiments, the fruity smell is selected from the group consisting of apple smell, pear smell, mango smell, grape smell, orange smell, mandarin smell, papaya smell, peach smell.

The smell additive may be distributed inside the enclosure used for stunning or pre-stunning. The smell additive may e.g. be administered in the form of a gas or in the form of droplets, e.g. as a mist of droplets, in particular in atomized form. For example, the smell additive is preferably concentrated atomized fruit juice in liquid form and/or one or more pheromones in liquid or firm form, such as in the form of a paste.

A fruit smell, in particular apple smell, has been found to effectively conceal the exposure to $CO_2$ such that many animals, in particular many pigs, do not become aware of the $CO_2$ exposure, i.e. the animals do not realize the treatment, e.g. during the early stages of the stunning process, e.g. before they lie down.

The at least one animal should preferably be exposed to an amount or concentration of the smell additive that is perceptible by the animal and sufficient to have calming effect and/or sufficiently conceals the presence of the stunning gas and/or pre-stunning relaxation gas. It will be appreciated that suitable amounts of the smell additive may depend on the size of the enclosure where the animals are stunned and/or undergo a pre-stunning process, how many animals are stunned or treated in pre-stunning process concurrently, the type of animal and the type of smell additive. Suitable amounts of smell additive can be determined by simple tests. In one example, between 1 g and 10 g of concentrated apple juice has been found sufficient for reducing animal reactions during a $CO_2$ stunning process of pigs. However, smaller or larger amounts may be used, e.g. depending on the size of the treatment enclosure, depending on the effectiveness of the distribution of the smell additive and/or depending on the type of smell additive. In some embodiments, the concentration of the smell additive, such as the concentrated fruit juice, e.g. apple juice, in the treatment enclosure is between 5 mg/m$^3$ and 5000 mg/m$^3$, such as between 50 mg/m$^3$ and 1000 mg/m$^3$, such as between 50 mg/m$^3$ and 500 mg/m$^3$. The amount or concentration of smell additive to which the at least one animal is exposed may be substantially constant throughout the major part of the exposure or the amount or concentration may vary throughout the exposure.

As will be described in greater detail below, the at least one animal may be exposed to the stunning gas and/or the pre-stunning relaxation gas in a treatment enclosure, in particular a stunning and/or pre-stunning enclosure. The smell additive may be dispensed into the treatment enclosure such that the smell additive is perceivable by the at least one animal when the at least one animal is inside the treatment enclosure. To this end, the smell additive may be dispensed into the treatment enclosure by a suitable dispensing device. In particular, the smell additive may be distributed throughout the entire treatment enclosure or at least throughout a portion of the treatment enclosure where the at least one animal is exposed to the pre-stunning relaxation gas and/or stunning gas.

A smell additive in liquid form may be sprayed into the atmosphere inside the treatment enclosure and/or sprayed onto a suitable surface inside the treatment enclosure. The smell additive may be sprayed as a mist or otherwise as small droplets, in particular in atomized form. Alternatively the smell additive may be dispensed in a different manner, e.g. by providing a scent container accommodating an odor dispensing material, such as a liquid, a paste or solid material. The dispensing device may include a gas intake and a gas exhaust and be configured to draw host gas into the air intake, past the odor dispensing material, e.g. through a porous or perforated material, and dispense the host gas including the smell additive into the treatment enclosure through the gas exhaust. The host gas may be the pre-stunning relaxation gas and/or stunning gas or a gas component of the pre-stunning relaxation gas and/or stunning gas or the host gas may be the atmospheric gas (including the stunning gas and/or pre-stunning relaxation gas) inside the treatment enclosure. It will be appreciated that other dispensing devices for dispensing the smell additive into the treatment enclosure may be used.

The smell additive may be dispensed into the treatment enclosure together with the stunning gas and/or the pre-stunning relaxation gas. To this end, the smell additive may be added to the stunning gas and/or pre-stunning relaxation gas or added to a gas component of the pre-stunning relaxation gas and/or stunning gas, e.g. prior to dispensing the mixture into the treatment enclosure. In particular, the smell additive may be mixed with the stunning gas and/or the pre-stunning relaxation gas or with a gas component thereof. A mixture of the smell additive and the stunning gas and/or pre-stunning relaxation gas or a mixture of the smell additive and a gas component of the pre-stunning relaxation gas and/or stunning gas may thus be dispensed into the treatment enclosure. Alternatively or additionally, the smell additive may be dispensed into the treatment enclosure separately from the stunning gas and/or the pre-stunning relaxation gas and separately from any components of the pre-stunning relaxation gas and/or stunning gas. Even when dispensed separately, the smell additive may be dispensed into the treatment enclosure concurrently with and/or prior to dispensing the stunning gas and/or pre-stunning relaxation gas, or concurrently with and/or prior to dispensing a gas component of the pre-stunning relaxation gas and/or stunning gas. To this end, the smell additive may be dispensed through one or more dispensing openings, e.g. nozzles, perforated material, porous material, etc. separate from the dispensing openings for dispensing the stunning gas and/or pre-stunning relaxation gas or for dispensing a gas component of the pre-stunning relaxation gas and/or stunning gas. The smell additive may be dispensed by a misting device or atomizer device.

When stunning the at least one animal by exposure to a stunning gas, the at least one animal is exposed to the stunning gas for a stunning exposure period. The length of the stunning exposure period may depend on the type of animal, the type of stunning gas and the concentration of the stunning gas. For example, when stunning pigs for slaughter using $CO_2$ stunning at $CO_2$ concentrations of at least 80%, the pigs may be exposed to the $CO_2$ for a stunning exposure period of 60 s or more, such as 90 s or more, such as 120 s or more. Similarly, when exposing at least one animal to a pre-stunning relaxation gas during a pre-stunning process, the at least one animal is exposed to the pre-stunning relaxation gas for a pre-stunning relaxation exposure period. The stunning exposure period and the pre-stunning relaxation exposure period do not need to have the same length. For the purpose of the present description, they will also briefly be referred to as exposure period.

The at least one animal is exposed to the smell additive for at least a part, in particular an initial part, of the exposure period during which the at least one animal is exposed to the pre-stunning relaxation gas and/or to the stunning gas. In some embodiments, exposure to the smell additive is initiated before exposure of the at least one animal to the pre-stunning relaxation gas and/or stunning gas, or at least before exposure of the at least one animal to the pre-stunning relaxation gas and/or stunning gas at a target concentration, in particular a maximum concentration, of the pre-stunning relaxation gas and/or stunning gas. For example, in some embodiments, exposure to the smell additive is initiated before the concentration of the pre-stunning relaxation gas and/or stunning gas, to which the at least one animal is exposed, reaches a trigger threshold, such as at least 10%, or lower.

In some embodiments, exposing the at least one animal to at least one smell additive is initiated before initiating exposing the at least one animal to a pre-stunning relaxation gas and/or stunning gas. To this end, the dispensing of the smell additive into the treatment enclosure may be initiated prior to dispensing the pre-stunning relaxation gas and/or stunning gas into the treatment enclosure or prior to dispensing a gas component of the pre-stunning relaxation gas and/or stunning gas into the treatment enclosure. Alternatively, e.g. in embodiments where the at least one animal enters a treatment enclosure that is pre-filled with pre-stunning relaxation gas and/or stunning gas, the smell additive may be dispensed in an entry area of the treatment enclosure where there is no or only little exposure to the pre-stunning relaxation gas and/or stunning gas, e.g. where the concentration of the pre-stunning relaxation gas and/or the stunning gas is low. When the at least one animal is transported into the treatment enclosure by a conveyor device, e.g. an elevator, the conveyor device may include a dispenser device for dispensing the smell additive such that the at least one animal is exposed to the smell additive when positioned on the conveyor device and prior to movement of the conveyor device into the treatment enclosure. In some embodiments, the smell additive may additionally be dispensed along a path from a holding area to the treatment enclosure or even in the holding area.

In some embodiments, exposure to the smell additive is initiated or continued while the at least one animal is exposed to the pre-stunning relaxation gas and/or stunning gas. Accordingly, the smell additive may be dispensed into the treatment enclosure concurrently with the dispensing of the pre-stunning relaxation gas and/or stunning gas or concurrently with the dispensing a gas component of the pre-stunning relaxation gas and/or stunning gas. Alternatively, the smell additive may be dispensed into a pre-filled treatment enclosure prior to, or concurrently with, the at least one animal entering the treatment enclosure. Regardless of whether exposure to the smell additive is initiated prior to or concurrently with the exposure to pre-stunning relaxation gas and/or stunning gas, the smell additive may continuously or intermittently be dispensed during at least a part of the exposure period during which the at least one animal is exposed to the pre-stunning relaxation gas and/or stunning gas, e.g. so as to maintain a sufficiently high concentration of smell additive over at least a part of the exposure period.

In some embodiments, the smell additive is dispensed throughout the entire exposure period so as to ensure exposure of the at least one animal to sufficiently high concentrations of the smell additive throughout the entire exposure to the pre-stunning relaxation gas and/or stunning gas. This may also apply in embodiments using a continuous operation, e.g. where animals are continuously advanced into a treatment chamber. Alternatively, dispensing of the smell additive may be terminated before the end of the exposure to the pre-stunning relaxation gas and/or stunning gas.

The duration of exposure to the smell additive may depend on the type of smell additive, the type of pre-stunning relaxation gas and/or stunning gas and on the type of animal. For example, when stunning animals, the at least one animal to be stunned may be exposed to the smell additive at least until the at least one animal reaches a state of unconsciousness and/or lies down. This duration may depend on the type and concentration of stunning gas and on the type of animal. For example, when stunning pigs using $CO_2$ concentrations of at least 80% most pigs lie down after about 30 s of exposure to the $CO_2$. Exposure to the smell additive may thus be terminated at least after 30 s such as at least after 60 s. It will be appreciated that exposure to the smell additive and, in particular, the dispensing of the smell additive, may be terminated earlier. In some embodiments, dispensing of the smell additive may be terminated 5 s after the start of the exposure to the pre-stunning relaxation gas and/or stunning gas, such as 10 s, such as 20 s, such as 30 s, such as 60 s after start of the exposure to the pre-stunning relaxation gas and/or stunning gas. For example, the longer after having been dispensed a smell additive remains perceptible to the animal and the longer the concentration of the smell additive remains sufficiently high for it to mask the perception of the pre-stunning relaxation gas and/or stunning gas, the earlier the dispensing of the smell additive may be terminated. Generally, in some embodiments, the at least one animal is simultaneously exposed to the smell additive and to the pre-stunning relaxation gas and/or the stunning gas for at least 5 s, such as at least 10 s, such as at least 20 s, such as at least 30 s, such as at least 60 s.

Preferably, when stunning animals, the at least one animal to be stunned is exposed to the smell additive from the start of the stunning process and until the at least one animal is lying down, as this is the period of highest likelihood of reactions when the animal is exposed to a stunning gas such as CO2. Accordingly, the smell additive may be dispensed together with or in addition to the pre-stunning relaxation gas and/or stunning gas. When stunning animals, the smell additive may thus repeatedly or continuously be dispensed during at least the initial phases of the stunning process, e.g. until animal is lying down or loses consciousness. The dispensing of the smell additive may be terminated when the animals to be stunned are lying down.

In some embodiments, the dispensing of the smell additive may be combined with a dispensing of the pre-stunning relaxation gas and/or stunning gas at relatively low dispensing speeds, i.e. at low flow speeds of the gas being dispensed. In particular, the introduction of gasses may be performed at a low flow speed larger than 0 m/s and below 4 m/s. This may e.g. be achieved by using cotton pipes that allow incoming gas to be distributed over a large area at low flow speed thereby exposing a larger number of pigs substantially simultaneously.

Figure 1:
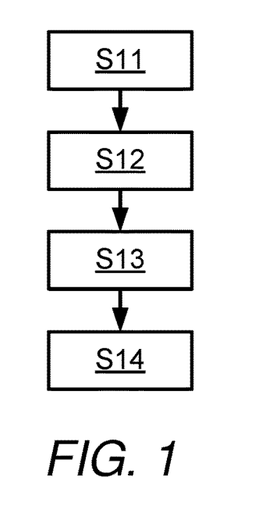
FIG. 1 schematically illustrates an embodiment of a stunning process and/or a pre-stunning process.

FIG. 1 shows a flowchart of an example of a method for stunning animals and/or pre-stunning animals.

In step S11, at least one animal is exposed to a stunning gas, such as $CO_2$, and/or to a pre-stunning relaxation gas. The at least one animal is concurrently exposed to at least one smell additive, such as apple smell or another type of fruit smell. To this end, the at least one animal may be moved into a treatment enclosure, such as a treatment chamber, that is pre-filled with a sufficiently high concentration of stunning gas and/or pre-stunning relaxation gas. Prior to or concurrently with the at least one animal entering the treatment enclosure, a smell additive may be dispensed inside the treatment enclosure. Alternatively, the at least one animal may be moved into the treatment enclosure while the stunning chamber is filled with atmospheric air. Once the at least one animal is positioned in the treatment enclosure, stunning gas and/or pre-stunning relaxation gas (or a gas component of the stunning gas and/or pre-stunning relaxation gas) is dispensed in the treatment enclosure and a smell additive is also dispensed into the treatment enclosure. Dispensing the smell additive may be initiated prior to or concurrently with the dispensing of the stunning gas and/or pre-stunning relaxation gas (or concurrently with dispensing a gas component of the stunning gas and/or pre-stunning relaxation gas). The dispensing of the smell additive may even be initiated prior to the animal entering the treatment enclosure.

In step S12, the dispensing of the smell additive is continued or repeated during an initial exposure period while the at least one animal remains exposed to the stunning gas and/or pre-stunning relaxation gas. For example, in some embodiments, when the at least one animal is exposed to a stunning gas, dispensing the smell additive may be repeated or continued until the at least one animal reaches a state on unconsciousness.

In step S13, exposure to the stunning gas and/or the pre-stunning relaxation gas is continued for an additional exposure period. Optionally, during this additional exposure period, the dispensing of the smell additive may be continued or repeated.

In step S14, the at least one animal is removed from the treatment enclosure. It will be appreciated, however, that pre-stunning and stunning may be performed in the same treatment enclosure. In that case, the at least one animal may be removed from the treatment enclosure after both processes have been concluded.

As mentioned above, the stunning process may be preceded by a pre-stunning process, in particular by a pre-stunning relaxation process where the at least one animal to be stunned is exposed to a pre-stunning relaxation gas.

In some embodiments, pre-stunning relaxation may be performed by exposing the at least one animal to a pre-stunning relaxation gas, e.g. to a gas mixture comprising $O_2$ at a concentration below 10%. The $O_2$ concentration may be above a minimum level of oxygen concentration, which may be higher than the anesthetic-causing concentration for the animals. The minimum level of the oxygen concentration in the gas mixture may differ according to animal species and may be between 3-10%. Preferably, the oxygen concentration is below 10% and above 4%, such as above 5%, such as above 6%. Especially for pigs the minimum level of the oxygen concentration of the pre-stunning relaxation gas mixture should preferably be about 6% to secure the animals is in a reduced stress level and not anesthetized.

The pre-stunning relaxation gas mixture may include one or more other gases normally present in atmospheric air, such as nitrogen, argon, carbon dioxide and combinations thereof. The pre-stunning relaxation gas mixture may further include small amounts of other gases, e.g. gases normally present in atmospheric air in small amounts. Preferably, the pre-stunning relaxation gas comprises a major amount of one or more physiologically inert gases such as nitrogen and/or argon and/or xenon. The term physiologically inert gas is intended to refer to any gas being physiological inert for the animals to be treated.

In some embodiment, the pre-stunning relaxation gas comprises no $CO_2$ or at least $CO_2$ only in amounts not increasing the stress level in the treated animals. In some embodiments, the concentration of carbon dioxide in the pre-stunning relaxation gas mixture is less than 5%, preferably less than 1%, such as less than 0.5%, such as less than 0.1%. This maximum concentration of carbon dioxide in the gas mixture may be higher for cattle, such as less than 21%, such as less than 15%, such as less than 10%.

In some embodiments, the oxygen level is decreased, in particular gradually decreased, during the pre-stunning process, from a maximum level, e.g. from a normal atmospheric concentration of oxygen, to a minimum level, which may be higher than the anesthetic-causing concentration for the animals. In one embodiment, the maximum level of oxygen is between 17 to 25%, preferably between 19 to 23%, preferably around 21%.

During the pre-stunning process, the concentration of the at least one physiologically inert gas may be increased from a minimum level to a maximum level.

In one embodiment, the minimal concentration of the at least one physiologically inert gas concentration is between 75 to 83%, preferably between 77 to 81%, preferably around 79%.

In one embodiment, the maximal concentration of the at least one inert gas concentration is between 90 to 97%, preferably between 92 to 96%, preferably around 94%.

Increase of the concentration of the physiologically inert gas and decrease of the concentration of oxygen may be obtained by dispensing the physiologically inert gas into the pre-stunning relaxation enclosure where the pre-stunning process is performed.

In one embodiment, the initial exposed gas mixture is atmospheric air.

In one embodiment, the at least one physiologically inert gas comprises $N_2$ gas and/or Ar.

In one embodiment, the gas mixture comprises $CO_2$ where the concentration of the $CO_2$ is in the range from 0.1% up to a maximum concentration level, where the maximum concentration level is lower than the anesthetic causing concentration level for the animals. This maximum $CO_2$ concentration level in the pre-stunning relaxation gas may be lower than 21%.

In some embodiments, the at least one animal is exposed to a smell additive prior to exposure to the pre-stunning relaxation gas and/or concurrently with exposure to the pre-stunning relaxation gas. For example, a smell additive may be dispensed inside a pre-stunning relaxation enclosure, such as a chamber or room, such as a sealed chamber or room, in particular an airtight chamber or room, where the at least one animal to be treated are positioned. The smell additive may be dispensed by atomizing a liquid smell additive inside the pre-stunning relaxation enclosure. Exposure to an atmosphere having a reduced $O_2$ concentration (compared to normal atmospheric air) and to a smell additive has a relaxing effect upon the animals.

In one embodiment the at least one pre-stunning relaxation enclosure may be a room where the animals live, or a room or chamber where the animals wait for a further process. The at least one chamber may be a transport enclosure on a transport conveyor system for transporting the animals to a stunning chamber. The at least one chamber may also be a chamber located prior to a stunning equipment or being part of a stunning equipment. In a chamber for reducing stress level of at least one animal, the pre-stunning relaxation gas mixture may be supplied to the chamber enclosing the at least one animal and the minimum level of oxygen and the maximum level of the at least one inert gas may be maintained in the chamber for a pre-stunning relaxation exposure period.

In another embodiment, the at least one pre-stunning relaxation enclosure extends from a first position where the animals are received to a second position where the at least one subsequent process, in particular the stunning process, takes place. The exposure to the pre-stunning relaxation gas occurs while the at least one animal moves from the first position towards the second position, the first position being the position where the concentration of the oxygen is maximum and where the concentration of the at least one inert gas is minimum, the second position being the position where the concentration of the oxygen is minimum and the concentration of the at least one inert gas is maximum. As an example, the first position may be a holding area position where animals are e.g. in groups entered into the at least one chamber, where appropriate mechanism encourages the animals to move, or automatically moves them, towards the second position, such that upon reach at the second position, the pre-stunning relaxation level has reached maximum. As an example, at the second position there may be a stunning device, i.e. when reaching the second position the animals may be transferred into the stunning enclosure.

In another embodiment, the step of exposing the animals to the gas mixture is while the animals are standstill.

Figure 2:
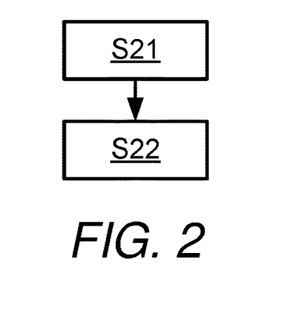
FIG. 2 schematically illustrates an embodiment of a stunning process, which includes a pre-stunning process.

FIG. 2 shows a flowchart of an example of a method for stunning animals where the process includes a pre-stunning process.

In step S21, at least one animal is exposed to a pre-stunning relaxation gas and to at least one smell additive, such as apple smell or another type of fruit smell. To this end, the at least one animal may be moved into a pre-stunning relaxation enclosure, such as a pre-stunning relaxation chamber. Once the at least one animal is positioned in the pre-stunning relaxation enclosure, the animal is exposed to a pre-stunning relaxation gas, e.g. by increasing the concentration of a physiologically inert gas and reducing the concentration of oxygen inside the pre-stunning relaxation enclosure. To this end, the pre-stunning relaxation enclosure may be sealed so as to prevent surrounding atmospheric air to enter the pre-stunning relaxation enclosure. The at least one animal is also exposed to a smell additive, e.g. by dispensing the smell additive into the pre-stunning relaxation enclosure. Dispensing the smell additive may be initiated prior to or concurrently with the exposure to the pre-stunning relaxation gas. The dispensing of the smell additive may even be initiated prior to the animal entering the pre-stunning relaxation enclosure.

In step S22, the stunning process is initiated, e.g. as described in connection with FIG. 1. To this end, the at least one animal may be moved from the pre-stunning relaxation enclosure into a separate stunning enclosure. Alternatively, the stunning process may be performed inside the same enclosure, e.g. by dispensing the stunning gas into the pre-stunning relaxation enclosure currently filled with the pre-stunning relaxation gas mixture. Dispensing of the smell additive may be repeated or continued during at least the initial period of the stunning process, e.g. as described in connection with FIG. 1.

In some embodiments the pre-stunning process, in particular the exposure to the pre-stunning relaxation gas is terminated prior to initiating the stunning process, in particular prior to exposure of the at least one animal to the stunning gas. Alternatively, the pre-stunning process and the stunning process may overlap. Accordingly, in some embodiments the pre-stunning process, in particular the exposure to the pre-stunning relaxation gas may continue after initiating the stunning process, in particular throughout an initial part or even the entire exposure of the at least one animal to the stunning gas.

Generally, embodiments of a system for pre-stunning and/or stunning animals comprise:
- an enclosure configured for enclosing at least one animal to be pre-stunned and/or stunned,
- means for providing a pre-stunning relaxation gas and/or stunning gas inside the enclosure, and
- means for supplying the enclosure with at least one smell additive.

The enclosure, which will also be referred to as treatment enclosure, may be a chamber or other type of enclosure. The at least one animal may itself move into the treatment enclosure be transported into the treatment enclosure, e.g. by a suitable conveyor device such as an elevator or the like. The treatment enclosure may be sealed, in particular airtight, during the stunning and/or pre-stunning process. Alternatively, the treatment enclosure may be partially open. For example, when the stunning gas and/or pre-stunning relaxation gas has a higher specific density than air, the treatment enclosure may be an upwardly open container or pit. The upwardly open container may be filled with an effective concentration of a stunning gas and/or pre-stunning relaxation gas into which the at least one animal may be submerged, e.g. by an elevator or other type of conveyor device.

In some embodiments, the stunning gas and/or pre-stunning relaxation gas is administered in a duct such as a U-shaped duct or a straight duct. The duct may be open at one end or both ends for entry and exit of animals. The duct may have a depressed section, in particular a depressed central section. A high concentration of stunning gas and/or pre-stunning relaxation gas, e.g. an anesthetizing or even collapse-inducing concentration of stunning gas may be maintained in the central section of the duct such that effective anesthetization and/or pre-stunning relaxation is produced in the central section. Animals may be driven from holding pens through pathways, e.g. constructed of large-diameter pipe or smooth metal, and onto conveyor devices that move the animals through the duct. The animals may be compartmentalized on the conveyor device, e.g. by mechanical impellers synchronized with the conveyor device, or they may otherwise be prevented from crowding.

The means for supplying the treatment enclosure with at least one smell additive may comprise one or more nozzles for dispensing the smell additive or another suitable device for dispensing the smell additive. The smell additive may be sprayed or otherwise dispensed in an amount or concentration controlled by suitable control means. In some embodiments, the system comprises a control unit and/or other control means for controlling the supply of the at least one smell additive and/or for controlling the supply of at least one host gas. The host gas may be the pre-stunning relaxation gas and/or stunning gas or a gas component of the stunning gas and/or pre-stunning relaxation gas. In some embodiments, the control unit is for controlling the supply of the host gas mixed with smell additive. The control means may include adjustable valves, adjustable nozzles, an adjustable pump or ventilator, or another device for controlling the amount of smell additive administered.

The means for providing a pre-stunning relaxation gas and/or stunning gas inside the enclosure may comprise one or more nozzles or other openings for dispensing the pre-stunning relaxation gas and/or stunning gas into the enclosure or for dispensing one or more gas components of the pre-stunning relaxation gas and/or stunning gas into the enclosure. The means for providing a pre-stunning relaxation gas and/or stunning gas inside the enclosure may be separate from or at least partially combined with the means for supplying the enclosure with at least one smell additive.

In some embodiments, the means for supplying the enclosure with at least one smell additive and the means for providing a pre-stunning relaxation gas and/or stunning gas inside the enclosure comprise one or more nozzles or other openings for dispensing a mixture of the smell additive and a host gas. The host gas may be the pre-stunning relaxation gas and/or stunning gas or a gas component of the stunning gas and/or pre-stunning relaxation gas. Accordingly, the means for supplying the enclosure with at least one smell additive may comprise a mixer for mixing the smell additive with the host gas prior to dispensing the host gas into the enclosure.

Alternatively or additionally, the means for supplying the enclosure with at least one smell additive may be separate from the means for providing a pre-stunning relaxation gas and/or stunning gas inside the enclosure. For example, the pre-stunning relaxation gas and/or stunning gas, or a gas component thereof, may be fed into the enclosure through a first set of conduits and/or openings. The smell additive may be fed into the enclosure through a second set of conduits and/or openings and/or other dispensing mechanism, separate from the first set of conduits and/or openings. Accordingly, in such embodiments the smell additive and the pre-stunning relaxation gas and/or stunning gas are mixed inside the enclosure.

Figure 3:
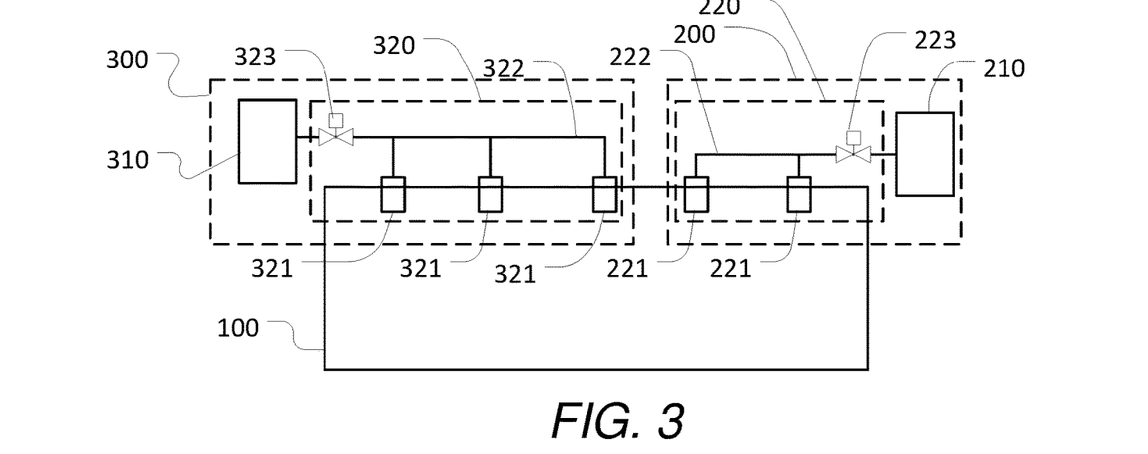
FIG. 3 schematically illustrates an embodiment of a system for stunning animals.

FIG. 3 schematically illustrates an example of a system for stunning and/or pre-stunning animals. In particular, the system is for reducing animal reactions to stunning gas and/or pre-stunning relaxation gas.

The system of FIG. 3 comprises a treatment enclosure 100 configured for enclosing at least one animal to be stunned or treated in a pre-stunning process, means 200 for supplying the enclosure with at least one smell additive, and means 300 for providing a pre-stunning relaxation gas and/or stunning gas inside the enclosure.

The means for supplying the enclosure with at least one smell additive may include a reservoir 210 for storying a smell additive and a dispensing device 220 for dispensing the smell additive inside the treatment enclosure 100. The reservoir 210 may be configured to hold a supply of smell additive, e.g. a liquid smell additive. The reservoir may be a container, such as a pressurized container. The dispensing device 220 may comprise one or more nozzles 221 or other openings, one or more conduits 222 for fluidly connecting the one or more nozzles or other openings with the reservoir 210, and a control device 223 for controlling the dispensing operation. The control device 223 may e.g. comprise a valve or other suitable device for controlling the flow of smell additive from the reservoir to the one or more nozzles. In embodiments where the reservoir 210 is not pressurized, the dispensing device may include a pump or other fluid moving device for moving the smell additive into the stunning chamber.

Similarly, the means 300 for providing a pre-stunning relaxation gas and/or stunning gas inside the enclosure may include a reservoir 310 and a dispensing device 320. The reservoir 310 is configured for storying the stunning gas and/or pre-stunning relaxation gas and/or one or more gas components of the pre-stunning relaxation gas and/or stunning gas. The dispensing device 320 is configured for dispensing the stunning gas and/or pre-stunning relaxation gas inside the treatment enclosure 100, or for dispensing one or more gas components of the pre-stunning relaxation gas and/or stunning gas inside the treatment enclosure 100. The reservoir 310 may include one or more pressurized containers. The dispensing device 320 may comprise one or more nozzles 321 or other openings, one or more conduits 322 for fluidly connecting the one or more nozzles or other openings with the reservoir 310, and a control device 323 for controlling the dispensing operation. The control device 323 may e.g. comprise a valve or other suitable device for controlling the flow of stunning gas and/or pre-stunning relaxation gas, or of one or more gas components thereof, from the reservoir to the one or more nozzles or other openings.

It will be appreciated that other means for supplying the enclosure with at least one smell additive may be used. For example, in some embodiments, a host gas may be led through or past a reservoir that holds a supply of smell additive, thereby allowing volatile compounds of the smell additive to be mixed with the host gas. The host gas including the smell additive may then be dispensed into the enclosure. Yet alternatively or additionally, other types of mixing the smell additive with the stunning gas and/or pre-stunning relaxation gas or with a gas component thereof may be used, e.g. by injecting an amount of smell additive into a flow of a host gas prior to dispensing the host gas mixed with smell additive into the treatment enclosure. The host gas may be the pre-stunning relaxation gas and/or the stunning gas or a gas component of the pre-stunning relaxation gas and/or the stunning gas.

While embodiments of the invention have been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for pre-stunning and stunning animals, the method comprising a stunning process, during which the animals are exposed to a stunning gas, and a process of reducing animal reactions when exposed to a pre-stunning relaxation gas and/or to the stunning gas during the stunning process or during a pre-stunning process preceding said stunning process, the method comprising:
    exposing at least one animal to a pre-stunning relaxation gas and/or stunning gas for an exposure period; and
    exposing the at least one animal to at least one smell additive at least during an initial part of said exposure period, in addition to the pre-stunning relaxation gas and/or stunning gas;
    wherein exposing the at least one animal to the at least one smell additive comprises dispensing the at least one smell additive via a dispensing device;
    wherein the smell additive is selected from the group of: one or more pheromones, chemical analogs of pheromones, natural fruity smells, and chemical analogs of natural fruity smells;
    wherein the step of exposing the at least one animal to at least one smell additive is initiated before initiating exposing the at least one animal to the pre-stunning relaxation gas and/or stunning gas;
    wherein the smell additive has no pharmacological effect and only masks perception by the at least one animal of exposure to an aroma of the stunning gas; and
    wherein the smell additive exposed to the at least one animal is provided in an amount that is perceptible by the at least one animal and further conceals presence of the pre-stunning relaxation gas and/or stunning gas.

2. The method according to claim 1, where the fruity smells are selected from the group of apple smell, pear smell, mango smell, grape smell, orange smell, mandarin smell, papaya smell, peach smell.

3. The method according to claim 1, where the stunning gas is $CO_2$ or a gas mixture comprising a major amount of $CO_2$.

4. The method according to claim 1, wherein the pre-stunning relaxation gas is a pre-stunning relaxation gas mixture comprising an $O_2$ concentration of less than 10%.

5. The method according to claim 1, wherein the at least one animal is simultaneously exposed to the smell additive and to the pre-stunning relaxation gas and/or the stunning gas for at least 5 s.

6. The method according to claim 1, wherein the at least one animal is exposed to the at least one smell additive at least until reaching a state of unconsciousness.

7. The method according to claim 1, wherein the at least one animal is a group of animals comprising at least 2 animals.

8. The method according to claim 1, wherein the at least one animal is exposed to a mixture comprising the stunning gas and the smell additive and/or to a mixture comprising the pre-stunning relaxation gas and the smell additive.

9. The method according to claim 1, wherein exposing the at least one animal to the smell additive comprises distributing the smell additive in a treatment enclosure as a gas, as droplets, or mist.

10. The method according to claim 1, wherein the pre-stunning relaxation gas comprises a mixture of at least one physiologically inert gas and oxygen;
    wherein the at least one physiological inert gas includes at least one of nitrogen, argon, and xenon.

11. The method according to claim 10 further comprising, during the pre-stunning process:
    increasing concentration of the at least one physiologically inert gas from a minimum level between 75 to 83% to a maximum level between 90 to 97% and decreasing concentration of the oxygen from a normal atmospheric level of oxygen to a minimum level between 17 to 25%.

12. The method according to claim 9, wherein the smell additive is further provided in the treatment enclosure as a paste.

13. A system for pre-stunning and/or stunning animals, the system comprising:
    an enclosure configured for enclosing at least one animal to be pre-stunned and/or stunned,
    means for providing a pre-stunning relaxation gas and/or stunning gas inside the enclosure,
    means for supplying the enclosure with at least one smell additive, wherein said means for supplying the enclosure with the at least one smell additive comprises a dispensing device to dispense the smell additive, and
    wherein the smell additive is selected from the group of: one or more pheromones;

chemical analogs of pheromones;
natural fruity smells; and
chemical analogs of natural fruity smells;
wherein the dispensing device is configured to dispense the smell additive before the means for providing the pre-stunning relaxation gas and/or the stunning gas provides said pre-stunning relaxation gas and/or said stunning gas inside the enclosure;
wherein the smell additive has no pharmacological effect and only masks perception of the stunning gas by the at least one animal of an aroma of the stunning gas; and
wherein the smell additive exposed to the at least one animal is provided in an amount that is perceptible by the at least one animal and further conceals presence of the pre-stunning relaxation gas and/or stunning gas.

14. The system according to claim 13, wherein the means for supplying the enclosure with at least one smell additive comprises one or more nozzles, misting device or atomizer device for dispensing the smell additive.

15. The system according to claim 13, wherein the means for providing a pre-stunning relaxation gas and/or stunning gas inside the enclosure comprises one or more nozzles, misting device or atomizer device for dispensing the pre-stunning relaxation gas and/or stunning gas or at least one gas component of the pre-stunning relaxation gas and/or stunning gas.

* * * * *